United States Patent Office 3,000,923
Patented Sept. 19, 1961

3,000,923
TETRAKIS(DIHYDROXYBOROXYALKYL)-
ALKYLENE DIAMINE PREPARATION
Mead S. Moores, Pittsburgh, Pa., assignor to Koppers Company, Inc., a corporation of Delaware
No Drawing. Filed June 20, 1960, Ser. No. 37,071
5 Claims. (Cl. 260—462)

This invention relates to the preparation of new monoesters of boric acid which contain more than one boron atom. In one specific aspect, it relates to the preparation of N,N,N',N'-tetrakis(2-dihydroxyboroxyalkyl)alkylenediamines by the reaction of boric acid with an amino tetrol, i.e. an N,N,N',N'-tetrakis(2-hydroxypropyl)alkylenediamine.

In the copending application of Bernard Rudner and Mead S. Moores, Serial No. 37,072 filed June 20, 1960, there is described and claimed a new class of boric acid monoesters, the tetrakis(dihydroxyboroxyalkyl)alkylenediamines, having the general formula:

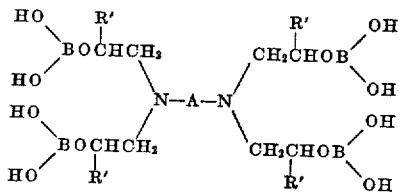

wherein R' is lower alkyl and A is a divalent lower alkylene chain, having from 2-6 carbon atoms, which is attached to each nitrogen atom through a different carbon atom. The simplest representative of this class of compounds is chemically N,N,N',N'-tetrakis(2-dihydroxyboroxypropyl)ethylenediamine; all other members are higher homologs thereof.

The tetrakis(dihydroxyboroxyalkyl)alkylenediamines are remarkably effective curing agents for paint latices and epoxies. For example, the compounds can be added in small amounts, e.g. 1–2% by weight, to a styrene-methacrylate latex to improve the solvent resistance and flame resistance of the films formed therefrom. Latices or emulsions containing the new compounds are storage stable and their films cure quickly to a smooth hard finish. In addition to serving as curing agents and flame resists, the presence of the new compounds in the paint latex in the above-indicated amounts serves to effectively increase the fungicidal power of the latex and the coating obtained therefrom.

One method of making the useful tetrakis (dihydroxyboroxyalkyl)alkylenediamines is disclosed and claimed in the copending application of Rudner et al., S.N. 37,072, filed June 20, 1960. Quite surprisingly, I have discovered that these compounds can be made directly by reacting boric acid with an N,N,N',N'-tetrakis(2-hydroxyalkyl)alkylenediamine. My new method shows considerable advantage over the method described in the copending application of Rudner et al., involving the hydrolysis of an alkylene-bis-boracyclooctane, in that the amino tetrol used as a starting material in my new method is required to make the intermediate used as a starting material in the method of the copending application.

It is therefore an object of the present invention to provide a new method for making a class of boric acid monoesters useful, inter alia, as curing agents and flame resists for latices and epoxies and as active ingredients in fungicides.

In accordance with the invention tetrakis(dihydroxyboroxyalkyl)alkylenediamines of the formula:

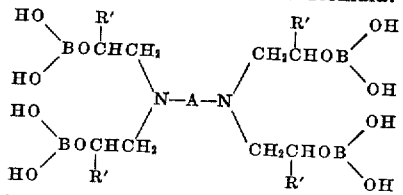

wherein R' is lower alkyl and A is a divalent lower alkylene chain having from 2–6 carbon atoms which is attached to each nitrogen atom through a different carbon atom, are made by reacting in a liquid medium at an elevated temperature boric acid and an aminotetrol of the formula:

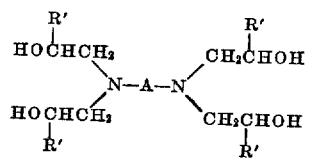

wherein R' is lower alkyl and A is a divalent lower alkylene chain having from 2–6 carbon atoms which is attached to each nitrogen atom through a different carbon atom, and recovering said tetrakis(dihydroxyboroxyalkyl)alkylenediamine from the reaction mixture.

The new reaction is shown below in Equation I:

(I)
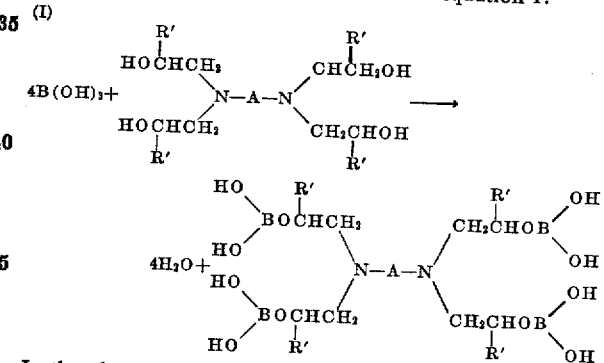

In the above equation, the values for A and R' are those given aforesaid.

As I have noted, the basic starting material for use in the invention are the N,N,N',N'-tetrakis-(2-hydroxyalkyl)alkylene diamines. Several of such diamines are commercially available and others are readily prepared by simple and straightforward procedures, e.g. the reaction of an alkylenediamine with an alkylene chlorohydrin. The boric acid can be used as such or, alternatively, it can be formed in situ by dissolving boric oxide in water or by using an acidic solution of an alkali metal tetra-, penta- or metaborate.

The reaction is conducted in an inert liquid medium which can be either aqueous or anhydrous. Thus, reaction can be effected by contacting the boric acid and the aminotetrol in water or an inert anhydrous organic solvent which forms an azeotrope with water or which has a boiling point higher than that of water. Such solvents include aromatic hydrocarbons such as benzene, xylene and the like; high boiling saturated aliphatic hydrocarbons such as n-decane, branched chain decanes, kerosene, naphtha etc.; chlorinated hydrocarbons such as chloroform and bromobenzene; ethers such as diglyme; ketones; amides such as dimethylformamide; and nitriles such as nitropropane and the like. The aqueous system is preferred because of its availability and lower cost. Furthermore, using the solvent system there is a greater possibility of forming a polymeric anhydride of the product as is illustrated in Example III. The polymeric anhydride can be converted to the desired tetrakis(2-dihydroxyboroxyalkyl)alkylenediamine by boiling the anhydride in water and crystallizing the product from the hot aqueous solution. If the organic solvent system is used, the product is repurified by recrystallization from water.

The mole ratio of the reactants used is not particularly critical, although for convenience, it is preferable to use substantially stoichiometric quantities, i.e. 4 moles of boric acid to 1 mole of the aminetetrol. It is possible to obtain a slightly higher yield by using a large excess of the aminotetrol, e.g. from 200–250% of the stoichiometric requirement, as is illustrated in the examples that follow.

The reaction temperature is maintained between about 50° C. and the boiling point of the reaction medium. Below about 50° C. reaction is quite slow and if the temperature is too high, i.e. above about 110° C., there is a tendency to cause the formation of large quantities of the polymeric anhydride. Thus, an extra step is required to convert the anhydride to the desired product. It is preferable to effect reaction at substantially atmospheric pressure, since no particular advantage is obtained using high vacuum or high positive pressures.

Reaction is generally complete in about 4–24 hours. If a solvent that forms an azeotrope with the water formed during the reaction is used as the reaction medium, it is possible to determine completion of the reaction by measuring the formation of the theoretical amount of water as it distills over as a solvent-water azeotrope.

The product tetrakis(2-dihydroxyboroxyalkyl)alkylenediamine can be easily separated from the aqueous reaction mixture, in the absence of excess boric acid, which is less water-soluble than the desired product. As I have already noted, if the solvent system is used, the product is recovered by recrystallization from water. After the product is separated from the reaction medium, it is washed with a minimum quantity of water, if desired, and thereafter dried.

My invention is further illustrated by the following examples.

Example I

Boric acid (219.2 g., 3.55 m.) and N,N,N',N'-tetrakis (2-hydroxypropyl)-ethylenediamine (321.6 g., 1.1 m., 24% excess), in 2 liters of water were heated on a steam cone overnight. Reduction of the volume of the solution and dilution with acetone gave 292.7 g. (70.5% of theory) of N,N,N',N'-(2-dihydroxyboroxypropyl) diamine, appearing as colorless crystals from hot water, M.P. 170–4° with foaming.

Example II

The procedure of Example I was substantially repeated with the exception that the amount of N,N,N',N'-tetrakis (2-hydroxypropyl)-ethylenediamine was increased to 220% in excess of the stoichiometric requirement. The yield of N,N,N',N'-tetrakis(2-dihydroxyboroxypropyl)-ethylenediamine thus obtained was 76.5% of theory.

Example III

Boric acid (123.6 g., 2.0 m.) and N,N,N',N'-tetrakis (2-hydroxypropyl)diamine (292.4 g., 1.0 m., 100% excess) were heated at reflux overnight in 1000 ml. of dry chloroform. The aqueous phase of the resulting azeotrope was then collected until 40 g. of water had distilled over. The reaction mixture was filtered hot to obtain 153 g. of crystalline solid. Recrystallization of this solid from water gave 17 g. of unchanged boric acid, 15 g. of N,N,N',N'-(2-hydroxyboroxypropyl)ethylenediamine, and, on evaporation of the aqueous filtrate, 98 g. of a clear colorless glass. A similar glass was obtained on evaporation of the original chloroform filtrate. Recrystallization of 50 g. of glass from water gave 30.9 g. of N,N,N',N' - (2 - hydroxyboroxypropyl)ethylenediamine, M.P. 165–170° C. with foaming, while evaporation of the filtrate gave 19.7 g. of a glass. Similarly, recrystallization of 122.6 g. of glass from water gave 21.4 g. of N,N,N',N' - (2 - hydroxyboroxypropyl)ethylenediamine, M.P. 166–7° C. with foaming, while evaporation of the filtrate gave 85 g. of a glass.

I claim:
1. A method of making a tetrakis(dihydroxyboroxyalkyl)alkylene diamine of the formula:

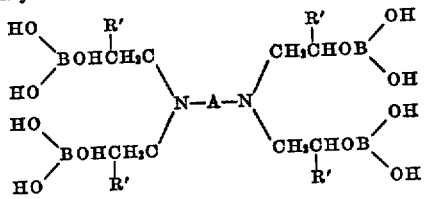

wherein R' is lower alkyl and A is a divalent normal lower alkylene chain having from 2–6 carbon atoms which is attached to each nitrogen atom through a different carbon atom comprising reacting in a liquid medium at an elevated temperature up to the boiling point of the reaction mixture an aminotetrol of the formula:

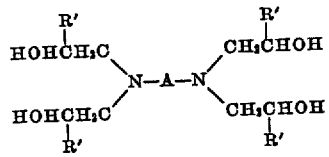

wherein R' and A are as defined aforesaid with boric acid, and recovering said tetrakis(dihydroxyboroxyalkyl) alkylene diamine from the reaction mixture.

2. Method according to claim 1 wherein the aminotetrol is present in an excess of up to 250% of the stoichiometric requirement.

3. Method according to claim 1 wherein the reaction temperature is maintained between 50 and 110° C.

4. Method according to claim 1 wherein the reaction is conducted in an aqueous medium.

5. Method according to claim 1 wherein the reaction is conducted in the presence of an inert anhydrous organic solvent.

No references cited.